(12) United States Patent
Grossman et al.

(10) Patent No.: US 11,427,175 B2
(45) Date of Patent: Aug. 30, 2022

(54) VEHICLE BRAKING SYSTEMS AND METHODS

(71) Applicant: Waymo LLC, Mountain View, CA (US)

(72) Inventors: William Grossman, Palo Alto, CA (US); David James Smith, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 167 days.

(21) Appl. No.: 16/714,906

(22) Filed: Dec. 16, 2019

(65) Prior Publication Data

US 2021/0179052 A1 Jun. 17, 2021

(51) Int. Cl.
*B60T 13/68* (2006.01)
*B60T 13/26* (2006.01)
(Continued)

(52) U.S. Cl.
CPC .......... *B60T 13/683* (2013.01); *B60T 13/263* (2013.01); *B60T 8/1708* (2013.01); *B60T 8/327* (2013.01); *B60T 15/041* (2013.01); *B60T 17/22* (2013.01)

(58) Field of Classification Search
CPC ...... B60T 8/327; B60T 8/1708; B60T 13/263; B60T 13/683; B60T 15/041; B60T 17/22;
(Continued)

(56) References Cited

U.S. PATENT DOCUMENTS 3,279,865 A * 10/1966 Bohn ............... B60T 13/268
303/13
3,847,446 A * 11/1974 Scharlack ............ B60T 8/1708
303/123

(Continued)

FOREIGN PATENT DOCUMENTS

GB 2555881 A * 5/2018 ............ B60T 13/662

OTHER PUBLICATIONS

Tebs E Versions E0 to E5.5 System Description from WABCO, Sep. 2018, downloaded on Dec. 13, 2019 (256 pages).

*Primary Examiner* — Robert A. Siconolfi
*Assistant Examiner* — San M Aung
(74) *Attorney, Agent, or Firm* — Fish & Richardson P.C.

(57) ABSTRACT

Techniques for braking an autonomous vehicle include providing a pressurized fluid stream from a plurality of pressurized fluid sources to a plurality of pressure-controlled electronic braking assemblies; providing the pressurized fluid stream from a pressurized fluid control output of a first pressure-controlled electronic braking assembly directly to a pressurized fluid control input of a second pressure-controlled electronic braking assembly; providing the pressurized fluid stream from the second pressure-controlled electronic braking assembly to at least one vehicle brake set; providing sensor output data from one or more vehicle sensors to a plurality of electronic control units; and based at least in part on the sensor output data, controlling at least one of the first or second pressure-controlled electronic braking assemblies to adjust a pressure of the pressurized fluid stream from at least one of the first or second pressure-controlled electronic braking assemblies to the vehicle brake set.

26 Claims, 4 Drawing Sheets

(51) Int. Cl.
*B60T 17/22* (2006.01)
*B60T 8/32* (2006.01)
*B60T 15/04* (2006.01)
*B60T 8/17* (2006.01)

(58) Field of Classification Search
CPC . B60T 8/02; B60T 8/17; B60T 8/1701; B60T 13/581; B60T 13/686; B60T 7/02; B60T 2270/10; B60T 2270/402; B60T 2270/403; B60T 2270/413
USPC ....................................................... 303/7, 20
See application file for complete search history.

(56) References Cited

U.S. PATENT DOCUMENTS

| | | | |
|---|---|---|---|
| 4,645,270 A * | 2/1987 | Camm | B60T 13/268 303/25 |
| 5,039,173 A * | 8/1991 | Emig | H02J 7/1446 303/7 |
| 8,428,863 B2 | 4/2013 | Kelly et al. | |
| 8,428,864 B2 | 4/2013 | Kelly et al. | |
| 8,457,877 B2 | 6/2013 | Kelly et al. | |
| 8,583,358 B2 | 9/2013 | Kelly et al. | |
| 8,589,062 B2 | 9/2013 | Kelly et al. | |
| 9,182,942 B2 | 11/2015 | Kelly et al. | |
| 9,296,370 B2 | 3/2016 | McClain et al. | |
| 9,889,835 B1 | 2/2018 | Antanaitis et al. | |
| 10,001,186 B2 | 6/2018 | Kasper et al. | |
| 10,065,613 B2 | 9/2018 | Linhoff et al. | |
| 10,065,647 B2 | 9/2018 | Tiwari et al. | |
| 10,137,931 B2 | 9/2018 | Scheibel | |
| 10,336,268 B2 | 6/2019 | Schroeder et al. | |
| 10,336,302 B2 | 6/2019 | Graney | |
| 10,351,110 B2 | 7/2019 | Besier et al. | |
| 10,379,007 B2 | 8/2019 | Perrone et al. | |
| 2007/0170774 A1 * | 7/2007 | Gerum | B60T 13/66 188/140 R |
| 2013/0016020 A1 | 1/2013 | Kelly et al. | |
| 2013/0016027 A1 | 1/2013 | Kelly et al. | |
| 2013/0017346 A1 | 1/2013 | Kelly et al. | |
| 2013/0018528 A1 | 1/2013 | Kelly et al. | |
| 2013/0162479 A1 | 6/2013 | Kelly et al. | |
| 2013/0184957 A1 * | 7/2013 | Herges | B60T 7/20 701/76 |
| 2015/0151726 A1 | 6/2015 | McClain et al. | |
| 2016/0214582 A1 * | 7/2016 | Brenn | B60T 7/042 |
| 2016/0325719 A1 | 11/2016 | Linhoff et al. | |
| 2016/0377508 A1 | 12/2016 | Perrone et al. | |
| 2017/0072920 A1 | 3/2017 | Besier et al. | |
| 2017/0291560 A1 | 10/2017 | Schroeder et al. | |
| 2017/0343070 A1 | 11/2017 | Schwartz et al. | |
| 2018/0037206 A1 | 2/2018 | Antanaitis et al. | |
| 2018/0058525 A1 | 3/2018 | Kasper et al. | |
| 2018/0065629 A1 | 3/2018 | Wolff et al. | |
| 2018/0099694 A1 | 4/2018 | Scheibel | |
| 2018/0154899 A1 | 6/2018 | Tiwari et al. | |
| 2018/0229738 A1 | 8/2018 | Nilsson et al. | |
| 2018/0339709 A1 | 11/2018 | Tiwari et al. | |
| 2018/0370503 A1 | 12/2018 | Graney | |
| 2019/0023151 A1 | 1/2019 | Glinka | |
| 2019/0071061 A1 | 3/2019 | Kozuka | |
| 2019/0106115 A1 | 4/2019 | Huang et al. | |
| 2019/0168724 A1 | 6/2019 | VandenBerg, III et al. | |
| 2019/0196020 A1 | 6/2019 | Aceti et al. | |
| 2019/0204845 A1 * | 7/2019 | Grossman | B60R 1/12 |
| 2019/0210544 A1 | 7/2019 | Gowda | |
| 2019/0210584 A1 | 7/2019 | Wood | |
| 2019/0217833 A1 | 7/2019 | Michalski et al. | |
| 2019/0217842 A1 | 7/2019 | Leinung et al. | |
| 2019/0225087 A1 | 7/2019 | Ernst | |
| 2019/0234474 A1 | 8/2019 | Schwartz et al. | |
| 2019/0248346 A1 | 8/2019 | Wulf | |
| 2019/0248350 A1 | 8/2019 | Wulf | |
| 2019/0299944 A1 | 10/2019 | Nilsson et al. | |
| 2019/0299955 A1 | 10/2019 | Szabela | |
| 2019/0299962 A1 | 10/2019 | Leiber et al. | |
| 2019/0337502 A1 | 11/2019 | Farres et al. | |
| 2019/0344799 A1 | 11/2019 | Tiwari | |

* cited by examiner

VEHICLE BRAKING SYSTEMS AND METHODS

BACKGROUND

This specification relates to vehicle braking systems and methods.

SUMMARY

This disclosure describes vehicle braking systems and methods. In some implementations, the vehicle braking systems and methods are applied to autonomous vehicles including self-driving cars, boats, or aircraft, which use a variety of on-board sensors and computer systems to detect nearby objects and use such detections to make control and navigation decisions. In some implementations, the vehicle braking systems and methods of the present disclosure are applied to commercial freight vehicles, such as Class 8 trucking vehicles, which may or may not be autonomous vehicles. In some aspects, vehicle braking systems and methods according to the present disclosure may include a redundant braking assembly.

In an example implementation, an autonomous vehicle braking system includes a plurality of pressure-controlled electronic braking assemblies and a plurality of electronic control units. Each pressure-controlled electronic braking assembly is fluidly coupled to at least one of a plurality of pressurized fluid sources and to at least one vehicle brake set of a plurality of vehicle brake sets of the autonomous vehicle. A pressurized fluid control output of a first pressure-controlled electronic braking assembly of the plurality of pressure-controlled electronic braking assemblies is directly connected to a pressurized fluid control input of a second pressure-controlled electronic braking assembly of the plurality of pressure-controlled electronic braking assemblies. Each of the plurality of electronic control units is communicably coupled to the first and second pressure-controlled electronic braking assemblies and one or more vehicle sensors. Each of the plurality of electronic control units is configured to command at least one of the first or second pressure-controlled electronic braking assemblies to adjust a pressure of at least one pressurized fluid stream from the at least one of the first or second pressure-controlled electronic braking assemblies to the at least one vehicle brake set based at least in part on sensor output from the one or more vehicle sensors.

In an aspect combinable with the example implementation, the plurality of pressurized fluid sources include a first pressurized fluid source connected to the first and second pressure-controlled electronic braking assemblies and a second pressurized fluid source connected to the first and second pressure-controlled electronic braking assemblies.

In another aspect combinable any one of the previous aspects, the pressurized fluid control output of the first pressure-controlled electronic braking assembly includes a first pressurized fluid control output of the first pressure-controlled electronic braking assembly and the pressurized fluid control input of the second pressure-controlled electronic braking assembly includes a first pressurized fluid control input of the second pressure-controlled electronic braking assembly.

Another aspect combinable any one of the previous aspects further includes a second pressurized fluid control output of the first pressure-controlled electronic braking assembly directly connected to a second pressurized fluid control input of the second pressure-controlled electronic braking assembly.

In another aspect combinable any one of the previous aspects, the second pressure-controlled electronic braking assembly includes a first pressurized fluid control output fluidly coupled to one of the plurality of vehicle brake sets and a second pressurized fluid control output fluidly coupled to another of the plurality of vehicle brake sets.

Another aspect combinable any one of the previous aspects further includes a vehicle operator brake pedal including a first pressurized fluid control output connected to a first pressurized fluid control input of the first pressure-controlled electronic braking assembly and a second pressurized fluid control output connected to a second pressurized fluid control input of the first pressure-controlled electronic braking assembly.

In another aspect combinable any one of the previous aspects, each of the plurality of electronic control units is configured to command at least one of the first or second pressure-controlled electronic braking assemblies to adjust the pressure of at least one pressurized fluid stream from the at least one of the first or second pressure-controlled electronic braking assemblies to the at least one vehicle brake set based at least in part on sensor output from the one or more vehicle sensors in an absence of a pressurized fluid output from either of the first pressurized fluid control output of the vehicle operator brake pedal or the second pressurized fluid control output of the vehicle operator brake pedal.

In another aspect combinable any one of the previous aspects, the one or more vehicle sensors include at least one of a radar sensor, an image sensor, or a lidar sensor.

In another aspect combinable any one of the previous aspects, each of the plurality of pressure-controlled electronic braking assemblies includes a trailer electronic braking assembly.

In another aspect combinable any one of the previous aspects, the at least one pressurized fluid stream includes a pneumatic fluid stream.

In another aspect combinable any one of the previous aspects, the plurality of electronic control units are communicably coupled to the first and second pressure-controlled electronic braking assemblies on a communication network.

Another aspect combinable any one of the previous aspects further includes a plurality of pressurized fluid control valves.

In another aspect combinable any one of the previous aspects, each of the pressurized fluid control valves communicably coupled to at least one of the electronic control units and fluidly coupled to a vehicle parking brake.

In another aspect combinable any one of the previous aspects, each of the plurality of electronic control units configured to command at least one of the pressurized fluid control valves to adjust a pressure of at least one pressurized fluid stream from the at least one of the first or second pressure-controlled electronic braking assemblies to the vehicle parking brake based at least in part on sensor output from the one or more vehicle sensors.

In another aspect combinable any one of the previous aspects, the plurality of pressurized fluid control valves are fluidly coupled in series with a binary valve positioned between the pressurized fluid control valves and the vehicle parking brake.

In another aspect combinable any one of the previous aspects, the binary valve is further fluidly coupled to an operator parking brake actuator through an operator parking brake control valve.

In another example implementation, a method for braking an autonomous vehicle includes providing at least one pressurized fluid stream from at least one of a plurality of pressurized fluid sources to a plurality of pressure-controlled electronic braking assemblies of an autonomous vehicle, where each pressure-controlled electronic braking assembly fluidly coupled to at least one vehicle brake set of a plurality of vehicle brake sets of the autonomous vehicle; providing the at least one pressurized fluid stream from a pressurized fluid control output of a first pressure-controlled electronic braking assembly of the plurality of pressure-controlled electronic braking assemblies directly to a pressurized fluid control input of a second pressure-controlled electronic braking assembly of the plurality of pressure-controlled electronic braking assemblies; providing the at least one pressurized fluid stream from the second pressure-controlled electronic braking assembly to the at least one vehicle brake set; providing sensor output data from one or more vehicle sensors of the autonomous vehicle to a plurality of electronic control units, each of the plurality of electronic control units communicably coupled to the first and second pressure-controlled electronic braking assemblies; and based at least in part on the sensor output data, controlling, with at least one of the electronic control units, at least one of the first or second pressure-controlled electronic braking assemblies to adjust a pressure of the at least one pressurized fluid stream from the at least one of the first or second pressure-controlled electronic braking assemblies to the at least one vehicle brake set.

In an aspect combinable with the example implementation, providing at least one pressurized fluid stream from at least one of a plurality of pressurized fluid sources to a plurality of pressure-controlled electronic braking assemblies of an autonomous vehicle includes providing a first pressurized fluid from a first pressurized fluid source to the first and second pressure-controlled electronic braking assemblies; and providing a second pressurized fluid from a second pressurized fluid source to the first and second pressure-controlled electronic braking assemblies.

In another aspect combinable any one of the previous aspects, providing the at least one pressurized fluid stream from the pressurized fluid control output of the first pressure-controlled electronic braking assembly of the plurality of pressure-controlled electronic braking assemblies directly to the pressurized fluid control input of the second pressure-controlled electronic braking assembly of the plurality of pressure-controlled electronic braking assemblies includes providing the first pressurized fluid from a first pressurized fluid control output of the first pressure-controlled electronic braking assembly directly to a first pressurized fluid control input of the second pressure-controlled electronic braking assembly; and providing the second pressurized fluid from a second pressurized fluid control output of the first pressure-controlled electronic braking assembly directly to a second pressurized fluid control input of the second pressure-controlled electronic braking assembly.

In another aspect combinable any one of the previous aspects, providing the at least one pressurized fluid stream from the second pressure-controlled electronic braking assembly to the at least one vehicle brake set includes providing the first pressurized fluid from a first pressurized fluid control output of the second pressure-controlled electronic braking assembly to one of the plurality of vehicle brake sets; and providing the second pressurized fluid from a second pressurized fluid control output of the second pressure-controlled electronic braking assembly to another of the plurality of vehicle brake sets.

Another aspect combinable any one of the previous aspects further includes providing the first and second pressurized fluid streams to a vehicle operator brake pedal; providing the first pressurized fluid stream from a first pressurized fluid control output of the vehicle operator brake pedal to a first pressurized fluid control input of the first pressure-controlled electronic braking assembly; providing the second pressurized fluid stream from a second pressurized fluid control output of the vehicle operator brake pedal to a second pressurized fluid control input of the first pressure-controlled electronic braking assembly; adjusting, based on operator input, a pressure of at least one of the first or second pressurized fluid streams with the vehicle operator brake pedal; and providing the adjusted at least one of the first or second pressurized fluid streams through the first and second pressure-controlled electronic braking assemblies and to the at least one vehicle brake set.

In another aspect combinable any one of the previous aspects, providing the adjusted at least one of the first or second pressurized fluid streams through the first and second pressure-controlled electronic braking assemblies includes providing the adjusted at least one of the first or second pressurized fluid streams through the first and second pressure-controlled electronic braking assemblies and to the at least one vehicle brake set at an unchanged pressure.

In another aspect combinable any one of the previous aspects, providing sensor output data from one or more vehicle sensors of the autonomous vehicle to a plurality of electronic control units includes providing at least one of radar sensor data, image sensor data, or lidar sensor data.

In another aspect combinable any one of the previous aspects, each of the plurality of pressure-controlled electronic braking assemblies includes a trailer electronic braking assembly.

In another aspect combinable any one of the previous aspects, the at least one pressurized fluid stream includes a pneumatic fluid stream.

In another aspect combinable any one of the previous aspects, the plurality of electronic control units are communicably coupled to the first and second pressure-controlled electronic braking assemblies on a communication network.

Another aspect combinable any one of the previous aspects further includes providing the at least one pressurized fluid stream from the at least one of the plurality of pressurized fluid sources to a plurality of pressurized fluid control valves that are fluidly coupled to a vehicle parking brake through a binary valve; providing additional sensor output data from the one or more vehicle sensors of the autonomous vehicle to the plurality of electronic control units, each of the plurality of electronic control units communicably coupled to a first or a second pressurized fluid control valves of the plurality of pressurized fluid control valves; based at least in part on the sensor output data, controlling, with at least one of the electronic control units, at least one of the first or second pressurized fluid control valves to pass the pressurized fluid stream to the binary valve; based on a pressure of the pressurized fluid stream passed to the binary valve from the at least one of the first or second pressurized fluid control valves being greater than a pressurized fluid stream passed to the binary valve from a third pressurized fluid control valve fluidly coupled to an operator parking brake, actuating the vehicle parking brake.

In another example implementation, an autonomous vehicle includes a vehicle frame; one or more vehicle sensors coupled with the vehicle frame; a plurality of wheels coupled to the vehicle frame; at least one vehicle brake set coupled to at least a portion of the plurality of wheels; and a vehicle braking system. The vehicle braking system includes a plurality of pressurized fluid supplies, a plurality of pressure-controlled electronic braking assemblies, and a plurality of electronic control units. Each pressure-controlled electronic braking assembly is fluidly coupled to at least one of the plurality of pressurized fluid supplies. A pressurized fluid control output of one of the plurality of pressure-controlled electronic braking assemblies is plumbed to a pressurized fluid control input of another of the plurality of pressure-controlled electronic braking assemblies. Each of the plurality of electronic control units is communicably coupled to the plurality of pressure-controlled electronic braking assemblies and the one or more vehicle sensors. The plurality of electronic control units are configured to perform operations including receiving sensor data from the one or more vehicle sensors; and based on the received sensor data, controlling at least one of the plurality of pressure-controlled electronic braking assemblies to adjust a pressure of a pressurized fluid circulated from at least one of the plurality of pressurized fluid supplies, through the at least one of the pressure-controlled electronic braking assemblies, to the at least one vehicle brake set.

In an aspect combinable with the example implementation, the autonomous vehicle includes a class 8, L4 autonomous vehicle.

In another aspect combinable any one of the previous aspects, a first brake sub-assembly includes a combination of a first pressure-controlled electronic braking assembly and a first electronic control unit.

In another aspect combinable any one of the previous aspects, a second brake sub-assembly includes a combination of a second pressure-controlled electronic braking assembly different than the first pressure-controlled electronic braking assembly and a second electronic control unit different than the first electronic control unit.

In another aspect combinable any one of the previous aspects, one of the first or second brake sub-assemblies is configured to adjust the pressure of the pressurized fluid circulated from the at least one of the plurality of pressurized fluid supplies, through the respective first or second pressure-controlled electronic braking assembly, to the at least one vehicle brake set based on the received sensor data independent of the other of the first or second brake sub-assemblies.

Example implementations according to the present disclosure may include one, some, or all of the following features. For example, implementations of the present disclosure may include a vehicle braking system that provides redundant, high resolution wheel speed odometry and speed. As another example, implementations of the present disclosure may include a vehicle braking system that provides both instantaneous wheel speeds and cumulative ticks as well as directionality. As another example, implementations of the present disclosure may include a vehicle braking system that is suitable for an L4 application and that minimizes or completely eliminates the need for any hardware modifications of existing braking system components (e.g., such as pressure-actuated brake assemblies) and can be implemented with only software or firmware changes. As another example, implementations of the present disclosure may include a vehicle braking system that provides a high quality, high reliability, redundant braking interface that is suitable for an L4 enabled self-driving system. Implementations of the present disclosure also may include an elegant parking brake implementation that has favorable failure modes and can be operated in both manual and automated modes.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This disclosure describes example implementations of vehicle braking systems and methods, such as braking systems and methods for autonomous vehicles. In some aspects, example implementations of the vehicle braking systems may include one or more redundant braking components, such as redundant pressure-controlled braking assemblies and redundant electronic control units, to provide for failsafe braking of, e.g., an autonomous vehicle.

Figure 1:
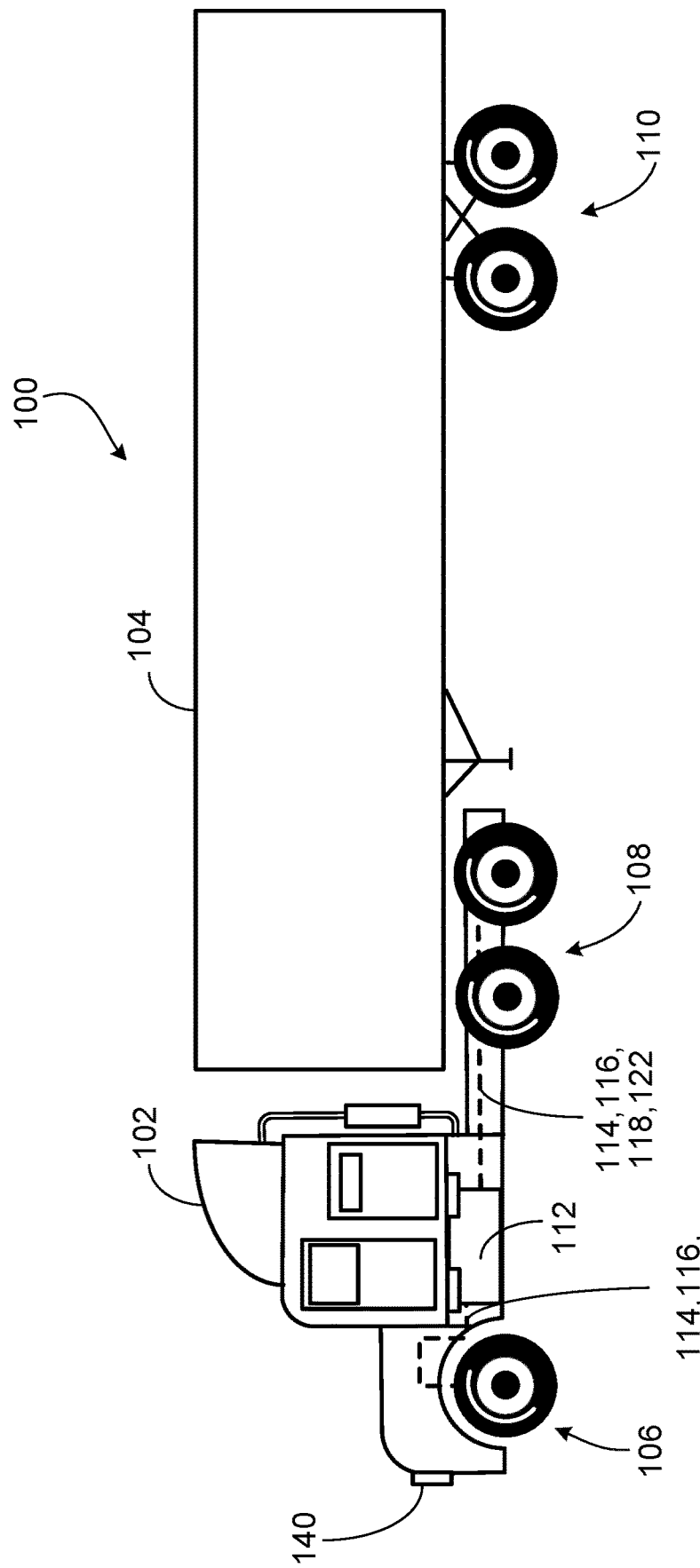
FIG. 1 is an example implementation of a vehicle that includes a vehicle braking system according to the present disclosure.

FIG. 1 is an example implementation of a vehicle 100 that includes a vehicle braking system 112 according to the present disclosure. Although the illustrated vehicle 100 is shown as a class 8 vehicle (e.g., a tractor trailer vehicle), the term "vehicle" in the present disclosure may also include another type of vehicle, such as a personal car, other personal or commercial trucks, and other vehicles (e.g., nautical or aeronautical vehicles). Vehicle 100, as shown, includes a tractor 102 and a trailer 104, each of which form part of a vehicle frame (in this example) that includes wheel sets 106 (front tractor wheels), 108 (rear tractor wheels), and 110 (trailer wheels). One or more vehicle brake sets (or, vehicle brakes) 114, 116, 118, 122 are associated with each of the wheel sets 106, 108, and 110.

The vehicle 100 in FIG. 1 can be a fully autonomous vehicle that determines and executes fully-autonomous driving decisions in order to navigate through an environment (e.g., a Level 2 through Level 5 automated vehicle according to the Society of Automotive Engineers (SAE)). The vehicle 102 can also be a semi-autonomous vehicle that uses predictions to aid a human driver. For example, the vehicle 102, as described more fully herein, can autonomously apply one or more sets of vehicle brakes 114, 116, 118, and 122 if a prediction indicates that a human driver is about to collide with another vehicle.

The vehicle 100 includes one or more sensors 140. The sensors 140 include, in this example implementation, a combination of components that receive reflections of electromagnetic radiation, e.g., lidar systems that detect reflections of laser light, radar systems that detect reflections of radio waves, and camera systems that detect reflections of visible light. The sensor data generated by a given sensor generally indicates a distance, a direction, or an intensity of reflected radiation (or a combination thereof). For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

Thus, in some aspects, the one or more sensors 140 may provide data that indicates a distance between the vehicle 100 and another object (e.g., a vehicle or otherwise) adjacent the tractor 102 of the vehicle 100. The provided data can be communicated, e.g., to the vehicle braking system 112, which may use the data to actuate one or more of the vehicle brakes 114, 116, 118, 122.

In this example, the vehicle brakes 114, 116, 118, 122 may include, e.g., front axle brakes, trailer brakes, foundation brakes, and parking brakes, respectively. Generally, the vehicle brakes 114-118 act as conventional brakes. For example, the vehicle brakes 114-118 may be pressure-actuated (e.g., hydraulically, pneumatically, or otherwise) to move a brake pad against a disc brake to create friction to slow and possibly stop the vehicle 102. The parking brake (vehicle brake 122) may be actuated to prevent unwanted movement of the vehicle 100 from a stationary position or, in extreme instances, actuated to quickly bring a "runaway" vehicle 100 to a stop.

The vehicle braking system 112, generally and discussed in more detail herein, may provide for a redundant braking interface (e.g., with primary and fallback interfaces are the same control method) that includes two or more pressure-controlled electronic brake assemblies connected in series and powered (electrically) from a low voltage vehicle bus (e.g., a 12 V bus). Each of the pressure-controlled electronic brake assemblies may be a trailer electronic brake (TEB) module (or a trailer electronic braking system (TEBS)), such as a TEBS E module from WABCO. In some aspects, the vehicle braking system 112 may include redundant interfaces to permanently secure the vehicle 100 in a parked state; a first interface may be through an electronic parking brake control over a vehicle communication network (e.g., a CAN bus network), while a second interface may be through a mechanical fail-on valve actuation when a supply pressure of a pressurized fluid drops below threshold value.

Figure 2:
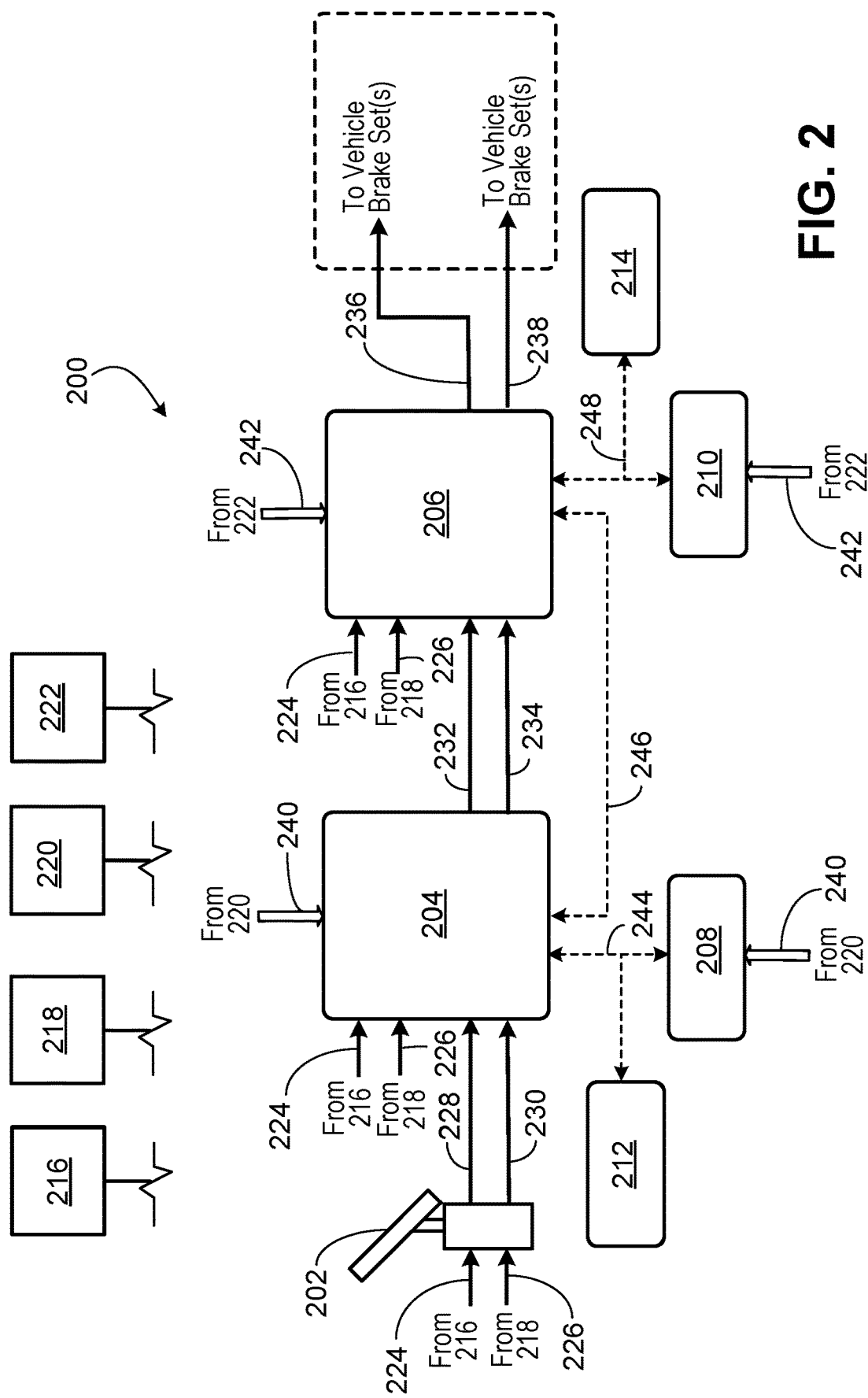
FIG. 2 is a block diagram of an example implementation of a vehicle braking sub-system according to the present disclosure.

FIG. 2 is a block diagram of an example implementation of a vehicle braking sub-system 200. In some aspects, the vehicle braking sub-system 200 may be part of the vehicle braking system 112 shown in FIG. 1. Generally, the vehicle braking sub-system 200 may operate to actuate one or more vehicle brake sets in a vehicle. In some aspects, like vehicle 100, the vehicle may be an autonomously controlled vehicle, such as an L4 autonomous vehicle that still includes an operator brake pedal. Thus, in some aspects, the vehicle braking sub-system 200 may operate in an autonomous or "active" mode (e.g., a normal operation for an autonomous vehicle) and a manual mode (e.g., in a non-autonomous vehicle or in an autonomous vehicle that includes an operator brake pedal).

As shown, the vehicle braking sub-system 200 includes a first pressure-controlled electronic braking assembly 204 and a second pressure-controlled electronic braking assembly 206. Although this implementation includes two pressure-controlled electronic braking assemblies, alternative implementations may include more than two pressure-controlled electronic braking assemblies. Each pressure-controlled electronic braking assembly 204 and 206, in this illustrated implementation, may be a TEB (or TEBS), which is connected to one or more pressurized-fluid sources and includes one or more pressure-control inputs and one or more pressure control outputs. In some aspects, the pressure-controlled electronic braking assemblies 204 and 206 operate with a pneumatic pressurized fluid, such as air or other gas. In alternative aspects, the pressure-controlled electronic braking assemblies 204 and 206 operate with a hydraulic pressurized fluid, such as a liquid. Each pressure-controlled electronic braking assembly 204 and 206 may operate to adjust a pressure of a pressurized fluid input to the particular pressure-controlled electronic braking assembly to provide a pressurized fluid output of the pressurized fluid at the adjusted pressure.

As shown in this figure, pressurized fluid source 216 and pressurized fluid source 218 are both connected to each pressure-controlled electronic braking assembly 204 and 206 to supply two pressurized fluid streams 224 and 226. In this example, both pressurized fluid streams 224 and 226 are supplied to an operator brake pedal 202, the pressure-controlled electronic braking assembly 204, and the pressure-controlled electronic braking assembly 206.

In this example, the pressure-controlled electronic braking assembly 204 is connected between the operator brake pedal 202 and the pressure-controlled electronic braking assembly 206. Pressurized fluid control outputs 232 and 234 from the pressure-controlled electronic braking assembly 204 are both directly connected (e.g., plumbed) to the pressure-controlled electronic braking assembly 206. Thus, as shown in this figure, the pressurized fluid control outputs 232 and 234 from the pressure-controlled electronic braking assembly 204 are also pressurized fluid control inputs 232 and 234 for the pressure-controlled electronic braking assembly 206 (e.g., a pressure of the pressurized fluid stream 232 output from pressure-controlled electronic braking assembly 204 is the same or negligibly different than the pressure of the pressurized fluid stream 232 input to pressure-controlled electronic braking assembly 206).

The pressure-controlled electronic braking assembly 206 includes a pressurized fluid control output 236 and a pressurized fluid control output 238 to provide pressurized fluid streams to actuate one or more vehicle brake sets of the vehicle. For example, the pressurized fluid stream of pressurized fluid control output 236 may be provided to a first vehicle brake set (or sets), such as the front axle and trailer brake sets (e.g., for the illustrated vehicle 100 of FIG. 1). The pressurized fluid stream of pressurized fluid control output 238 may be provided to a second vehicle brake set (or sets), such as the rear axle and trailer brake sets (e.g., for the illustrated vehicle 100 of FIG. 1).

The operator brake pedal 202 may be actuated by a vehicle (human) operator to provide a pressurized fluid control output 228 and a pressurized fluid control output 230 to the pressure-controlled electronic braking assembly 204. A pressure of the pressurized fluid of pressurized fluid control output 228 and pressurized fluid control output 230 is controlled (e.g., adjusted) based on actuation of the operator brake pedal 202.

The illustrated vehicle braking sub-system 200 includes electric power sources 220 and 222 that provide electrical power 240 and 242 (e.g., 12 V power) to the pressure-controlled electronic braking assemblies 204 and 206, respectively. Thus, as shown, there are redundant sources of electrical power for the vehicle braking sub-system 200.

The illustrated vehicle braking sub-system 200 also includes a first electronic control unit (ECU) 208 and a second electronic control unit (ECU) 210 (powered by the electrical power 240 and 242, respectively). As shown, the ECU 208 is communicably connected to the pressure-controlled electronic braking assembly 204 through network connection 244 (e.g., on a CAN bus network). The ECU 208 is also communicably connected to the pressure-controlled electronic braking assembly 206 through the pressure-controlled electronic braking assembly 204 and network connection 246. As shown, the ECU 210 is communicably connected to the pressure-controlled electronic braking assembly 206 through network connection 248 (e.g., on a CAN bus network). The ECU 210 is also communicably connected to the pressure-controlled electronic braking assembly 204 through the pressure-controlled electronic braking assembly 206 and network connection 246. Each ECU, generally, comprises a micro-processor based controller that, e.g., receives data from the vehicle (such as one or more vehicle sensors 140) and controls operation of the pressure-controlled electronic braking assemblies 204 and 206 to control or adjust a pressure of one or more pressurized fluid streams (e.g., 236 and 238) provided to actuate one or more vehicle brake sets. As shown, each ECU 208 and 210 are communicably coupled to one or more additional ECUs 212 or 214 through the illustrated network communications 244 and 248. The additional ECUs 212 and 214 may control other components of the vehicle besides the one or more vehicle brake sets.

In operation (in the case of an autonomous vehicle), the vehicle braking sub-system 200 may operate in active mode, in which the ECUs 208 and 210 control operation of the pressure-controlled electronic braking assemblies 204 and 206 based on, e.g., receipt of vehicle sensor data from the vehicle sensors 140. For example, if the vehicle sensor data does not indicate a need for braking or stopping the vehicle, the ECUs 208 and 210 may not operate to control the respective pressure-controlled electronic braking assemblies 204 and 206 to adjust a pressure of the pressurized fluid control outputs 236 and 238 to actuate the one or more vehicle brake sets. If the vehicle sensor data does indicate a need for braking or stopping the vehicle, the ECUs 208 and 210 operate to control the respective pressure-controlled electronic braking assemblies 204 and 206 to adjust the pressure of the pressurized fluid control outputs 236 and 238 to actuate the one or more vehicle brake sets.

Even when the vehicle is an autonomous vehicle (e.g., an L4 vehicle), the vehicle braking sub-system 200 may operate in manual mode as well. In manual mode, the operator brake pedal 202 may be adjusted (by the human vehicle operator) to adjust the pressure of the pressurized fluid control outputs 228 and 230. As this adjustment raises the pressure of the pressurized fluid greater than that of the control outputs 232 and 234, the pressurized fluid control outputs 228 and 230 may pass through the pressure-controlled electronic braking assemblies 204 and 206 without further adjustment to the control outputs 236 and 238 (and to the one or more vehicle brake sets). Thus, in some aspects, even when the vehicle braking sub-system 200 is operating in active mode, the pressure-controlled electronic braking assemblies 204 and 206 do not (and cannot) prevent the operator brake pedal 202 from being actuated to build brake pressure due to a mechanical "highest pressure wins" valve inside the pressure-controlled electronic braking assemblies 204 and 206.

During operation, the pressure-controlled electronic braking assemblies 204 and 206 may monitor control input pressure (e.g., 228 and 230 to pressure-controlled electronic braking assembly 204 and 232 and 234 to pressure-controlled electronic braking assembly 206) and control output pressures (e.g., 228 and 230 from operator brake pedal 202, 232 and 234 from pressure-controlled electronic braking assembly 202, and 236 and 238 from pressure-controlled electronic braking assembly 204) and report these over network communications 244, 246, and 248. Such signals are used to detect normal operating conditions, driver brake actuations, as well as fault conditions. For example, as for fault modes, in some aspects, no single network communication fault (e.g., CAN bus fault) can interrupt all communications between the ECUs 208 and 210 and the pressure-controlled electronic braking assemblies 204 and 206. Also, no single hardware/pressurized-fluid fault may prevent the ECUs 208 and 210 from operating to build brake pressure in the pressure-controlled electronic braking assemblies 204 and/or 206 through the network communication interfaces 244, 246, and 248.

During operation, the pressure-controlled electronic braking assemblies 204 and 206 may not interfere with and are unaffected by other ECUs 212 and 214 operating on the network communications (e.g., other CAN bus nodes). Further, the pressure-controlled electronic braking assemblies 204 and 206 may appear as similar nodes to an anti-lock braking (ABS) system of a vehicle as does the operator brake pedal 202, thereby allowing brake control of the one or more vehicle brake sets from the pressure-controlled electronic braking assemblies 202 and 204 to pass through standard ABS and vehicle electronic stability control (ESC) functional blocks of the pressure-controlled electronic braking assemblies 202 and 204 as conventionally designed in these component.

Figure 3:
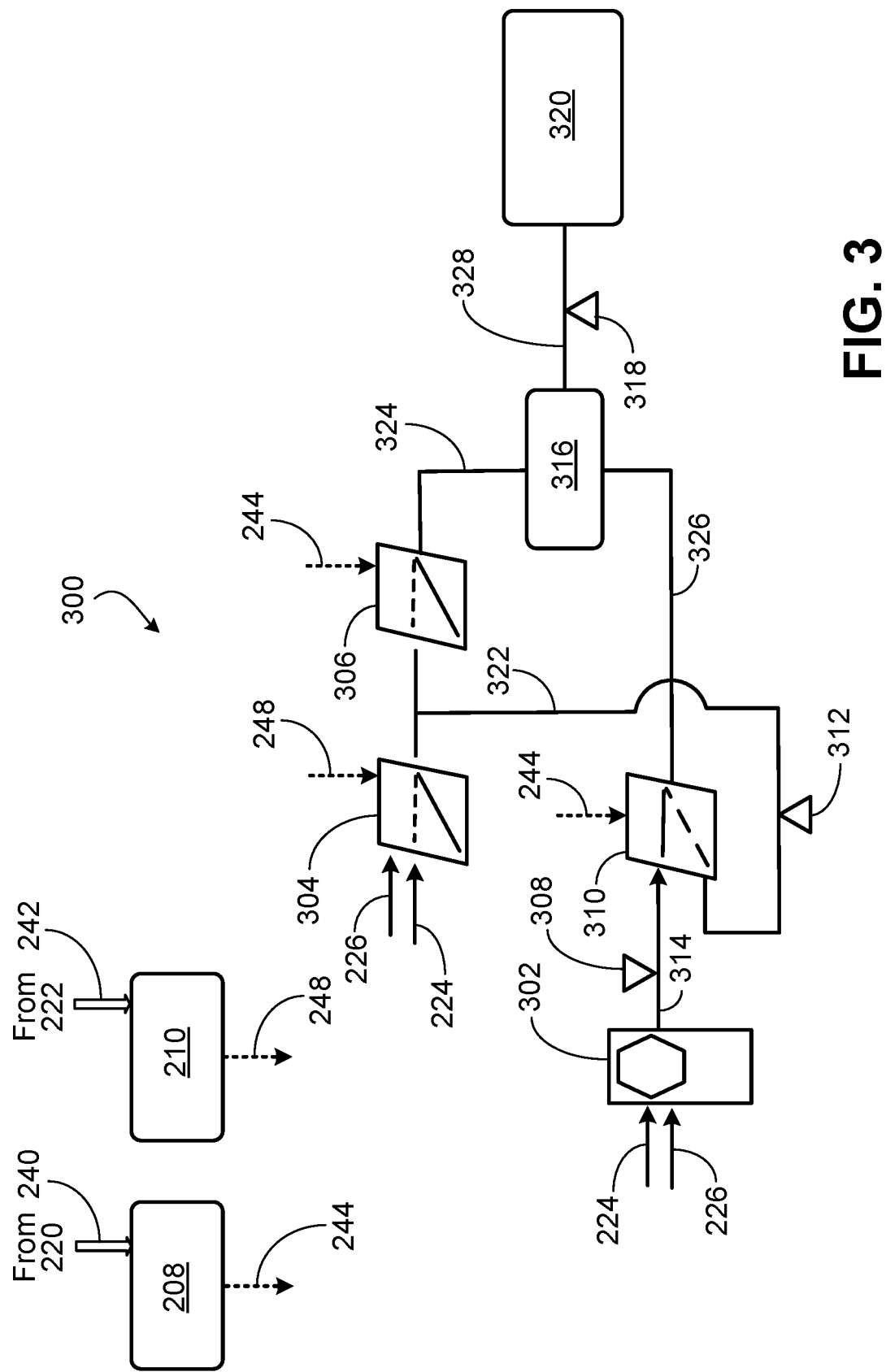
FIG. 3 is a block diagram of an example implementation of another vehicle braking sub-system according to the present disclosure.

FIG. 3 is a block diagram of an example implementation of another vehicle braking sub-system 300 according to the present disclosure. In some aspects, the vehicle braking sub-system 300 may be part of the vehicle braking system 112 shown in FIG. 1 and also include some components of the vehicle braking sub-system 200 shown in FIG. 2. Generally, the vehicle braking sub-system 300 may operate to actuate a parking brake in a vehicle. In some aspects, like vehicle 100, the vehicle may be an autonomously controlled vehicle, such as an L4 autonomous vehicle that still includes an operator parking brake. Thus, in some aspects, the vehicle braking sub-system 300 may operate in an autonomous or "active" mode (e.g., a normal operation for an autonomous vehicle) and a manual mode (e.g., in a non-autonomous vehicle or in an autonomous vehicle that includes an operator parking brake).

As shown, the vehicle braking sub-system 300 includes an operator parking brake 302 that is connected to pressurized fluid sources 216 and 218 to receive pressurized fluid streams 224 and 226. A pressurized fluid control output 314 from the operator parking brake 320 connects to a control valve 310, with a pressure sensor 308 in communication with the output 314 to provide a sensed pressure value of the pressurized fluid in the control output 314. The control valve is also communicably coupled to the ECU 208 through network communication 244. In FIG. 3, a dashed line as shown in a control valve represents an "ON" state when the pathway through the valve is powered, while a solid line shown in a control valve represents an "OFF" state when the pathway through the valve is not powered or when the valve is in a failed state.

As further shown, a control valve 304 is communicably coupled to the ECU 210 on the network communication interface 248 and is also fluidly coupled to the pressurized fluid sources 216 and 218 to receive pressurized fluid streams 224 and 226. A pressurized fluid control output 322 is connected from the control valve 304 to a control valve 306 as well as control valve 310. In the example implementation, a pressure sensor 312 is in communication with the output 322 to provide a sensed pressure value of the pressurized fluid in the control output 322 upstream of the control valve 310.

The control valve 306 is communicably coupled to the ECU 208 on the network communication interface 244. The control valve 306 receives the pressurized fluid control output 322 from the control valve 304 (as an input) and provides a pressurized fluid control output 324 to a binary valve 316 (e.g., an "or" valve that allows a high pressurized fluid to pass through). The control valve 310 also provides a pressurized fluid control output 326 to the binary valve 316. A pressurized fluid control output 328 is connected from the binary valve 316 to a vehicle parking brake 320 (e.g., tractor parking brake, trailer parking brake, or both). A pressure sensor 318 is in communication with the output 328 to provide a sensed pressure value of the pressurized fluid in the control output 328 downstream of the binary valve 316.

In some aspects, the vehicle braking sub-system 300 allows a conventional pressure actuated (e.g., pneumatic or hydraulic) parking brake to be implemented in an autonomous vehicle braking system (e.g., system 112) without interfering with operator control of the vehicle parking brake 320. For example, when the vehicle braking sub-system 300 is operating in a manual mode (e.g., even in an autonomous vehicle such as an L4 vehicle). During a manual mode, e.g., when the ECUs 208 and 210 are not commanding the control valves 306, 304, and 310, and they are in their default state, the operator parking brake 302 operates conventionally to apply the vehicle parking brake 320 (e.g., to keep the vehicle at a stationary position). In some aspects, the operation of the vehicle parking brake 320 by the operator parking brake 302 in a manual mode is not changed relative to conventional operation, e.g., for a Class 8 truck in this industry. Further, in some aspects, the fault modes of the vehicle braking sub-system 300 are unchanged relative to conventional Class 8 parking brake system layouts in the manual mode, e.g., portion of the vehicle parking brake 320 that includes the operator parking brake 302.

As shown, FIG. 3 shows a single circuit (e.g., single vehicle braking sub-system 300) that describes an example implementation of the sub-system 300 for, e.g., a tractor of a Class 8 vehicle. In some aspects, the example implementation of the sub-system 300 may be duplicated for, e.g., a trailer of the Class 8 vehicle (i.e., a parking brake system for the system). For instance, control valves, such as control valves 304, 306, 310, and 316 would be duplicated. Further, for instance, the operator parking brake 302 may include a standard square yellow push-pull knob for trailer parking brake actuation. Thus, in some aspects, the vehicle 100 may include two vehicle braking sub-systems 300, where a first vehicle braking sub-system 300 controls a tractor parking brake and a second vehicle braking sub-system 300 controls a trailer parking brake.

In an active mode (e.g., autonomous vehicle control by the ECUs 208 and 210), the operator parking brake 302 may be set to "apply parking brake" such that in the event of a dual failure of power (e.g., electrical or pressurized fluid) or network communication, the vehicle parking brake 320 is applied (e.g., automatically and mechanically). As shown in vehicle braking sub-system 300, the layout of the control valves 304, 306 and 310 (and binary OR valve 316) provides that even if any single control valve (304, 306, 310) becomes stuck or faults to the wrong location, the vehicle braking sub-system 300 still has full control over the parking brake (e.g., can still apply and release the vehicle parking brake 300).

For example, as shown in FIG. 3, the control valves 304, 306, and 310 are shown with default (solid line) and non-default (dashed line) positions. Control valves 304 and 306 have default positions that fluidly decouple the pressurized fluid streams 224 and 226 from the binary OR valve 316, while the control valve 310 has a default position that fluidly couples the pressurized fluid streams 224 and 226 with the binary OR valve 316. During autonomous operation control, however, should one or both of the ECUs 208 and 210 determine that the vehicle parking brake 320 should be applied (e.g., in the case of a runaway vehicle situation) even when the operator parking brake 302 is not applied, one or both of the ECUs 208 or 210 may set control valves 304 and 306 to their default positions, thereby exhausting pressure in pressurized fluid output 324 to actuate the vehicle parking brake 320 through the binary OR valve 316. Control valve 310 can also be set to either default or non-default position by the ECU 208 in such a manner as to actuate the vehicle parking brake 320 (exhausting air pressure in pressurized fluid output 326) through either output 314 and operator parking brake 302 or through pressurized fluid output 322.

As the pressurized fluid control output 324 may be greater than the pressurized fluid output 326, the binary OR valve 316 passes the pressurized fluid control output 324 to actuate the vehicle parking brake 320. In the case where any single control valve shown in FIG. 3 is in an incorrect position, the cross-circuit control valves combined with the binary OR valve 316 provides full control authority via either the operator circuit (e.g., the pressurized fluid circuit that includes the operator parking brake 302) or the autonomous circuit (e.g., the pressurized fluid circuit that includes control valves 304 and 306 controlled by the ECUs 208 and 210).

During operation of the vehicle braking sub-system 300, in some aspects, no single network communication interface (e.g., CAN bus) fault or digital I/O fault can accidentally apply or release the vehicle parking brake 320. Further, in some aspects, no single hardware/pressurized fluid fault can cause faulty application of the vehicle parking brake 320 or prevent one or both of the ECUs 208 and 210 from applying or releasing the vehicle parking brake 320. In some aspects, in the event of a dual network communication or power (e.g., electrical or pressurized fluid) fault, the vehicle braking sub-system 300 may apply the vehicle parking brake automatically as a failsafe fault mode (e.g., to prevent a runaway autonomous vehicle).

Figure 4:
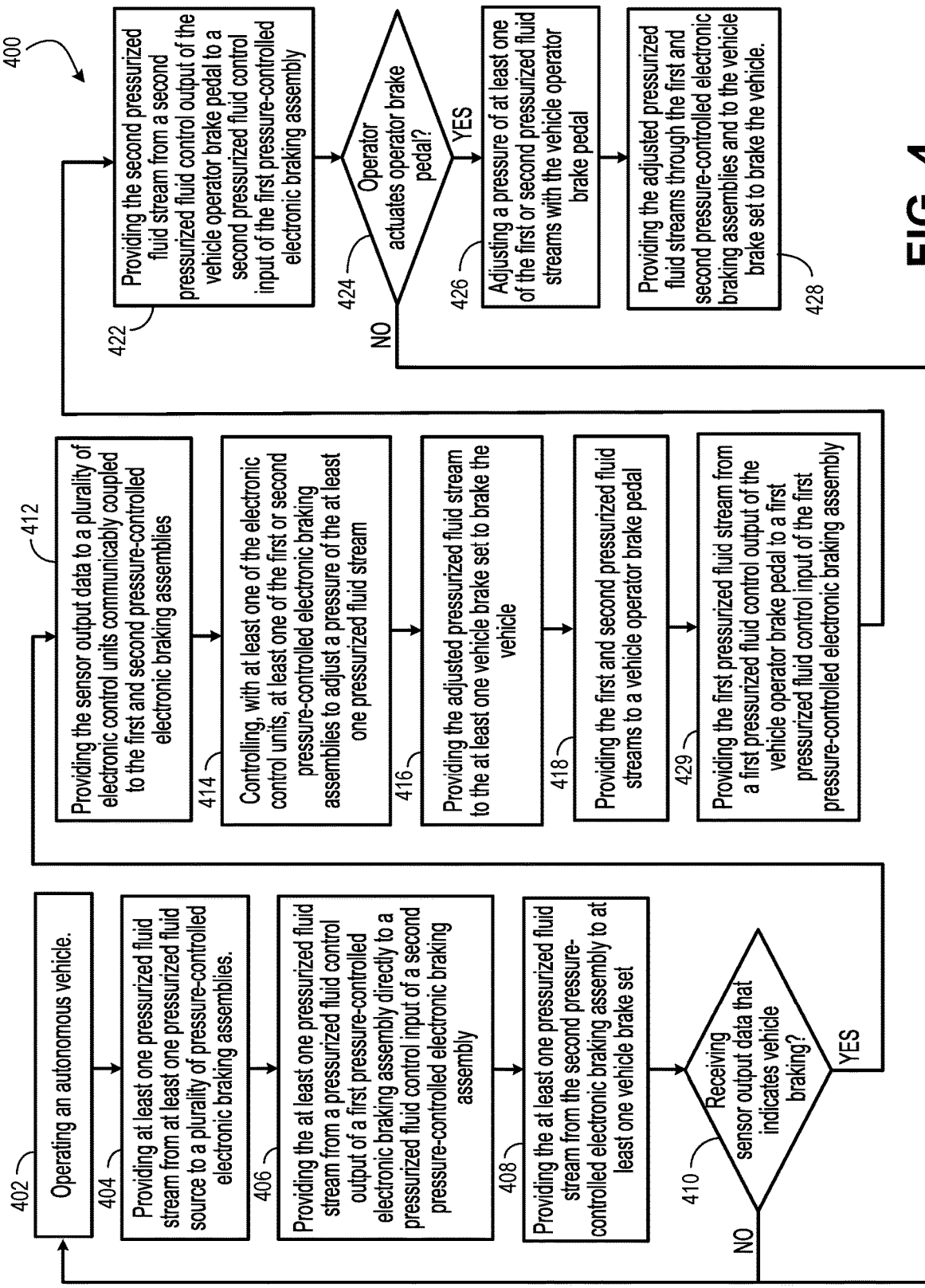
FIG. 4 is a flowchart that describes an example method for braking a vehicle according to the present disclosure.

FIG. 4 is a flowchart that describes an example method 400 for braking a vehicle according to the present disclosure. For example, in some aspects, the method 400 may be implemented by or with the vehicle braking sub-system 200 as shown and described in FIG. 2. Alternatively, the method 400 may be implemented by or with a vehicle braking sub-system in accordance with the present disclosure. Method 400 may begin at step 402, which includes operating an autonomous vehicle. For example, the vehicle may be an L2-5 vehicle, such as an L4 vehicle. In some aspects, the vehicle is a class 8 tractor-trailer autonomous vehicle. The autonomous vehicle may be operated (e.g., driven, navigated) by one or more electronic control units (ECUs) in combination with one or more vehicle sensors that provide sensor data to the ECUs for navigation determinations.

Method 400 may continue at step 404, which includes providing at least one pressurized fluid stream from at least one pressurized fluid source to a plurality of pressure-controlled electronic braking assemblies. For example, in some aspects, there are multiple (e.g., two) pressurized fluid streams that are provided from independent and separate pressurized fluid sources on the vehicle (e.g., hydraulic or pneumatic sources).

Method 400 may continue at step 406, which includes providing the at least one pressurized fluid stream from a pressurized fluid control output of a first pressure-controlled electronic braking assembly directly to a pressurized fluid control input of a second pressure-controlled electronic braking assembly. For example, the pressurized fluid streams are provided separately to independent and separate pressure-controlled electronic braking assemblies. In some aspects, one of the pressure-controlled electronic braking assemblies is directly plumbed to another pressure-controlled electronic braking assembly (e.g., in a series arrangement). Thus, in some aspects, a first pressurized fluid stream is provided from an output of the first pressure-controlled electronic braking assembly directly (e.g., without pressure change) to an input of the second pressure-controlled electronic braking assembly. Further, step 406 may also include providing a second pressurized fluid stream from another output of the first pressure-controlled electronic braking assembly directly (e.g., without pressure change) to another input of the second pressure-controlled electronic braking assembly.

Method 400 may continue at step 408, which includes providing the at least one pressurized fluid stream from the second pressure-controlled electronic braking assembly to at least one vehicle brake set. For example, in some aspects, the autonomous vehicle may have multiple brake sets, each of which is actuated separately but simultaneously. In some aspects, the second pressure-controlled electronic braking assembly is fluidly connected to each of the multiple vehicle brake sets (e.g., through separate pressurized fluid outputs from the second pressure-controlled electronic braking assembly).

Method 400 may continue at step 410, which includes a determination of whether sensor output data from one or more vehicle sensors (e.g., image sensors, lidar sensors, radar sensors, or otherwise) that indicates a need for vehicle braking is received at the one or more ECUs (e.g., ECUs 208 and 210 as shown in FIG. 2). For example, the sensor data may indicate an upcoming object (e.g., another vehicle or otherwise) in a path of the autonomous vehicle, thereby indicating that the autonomous vehicle should brake. If the determination is yes, then method 400 may continue at step 412, which includes providing the sensor output data to a plurality of electronic control units communicably coupled to the first and second pressure-controlled electronic braking assemblies. For example, the sensor output data may be provided to the one or more ECUs (e.g., ECUs 208 and 210 as shown in FIG. 2) for a determination of whether braking (and how much braking) is needed. If the determination of step 410 is no, then method 400 may return to step 402.

Method 400 may continue at step 414, which includes controlling, with at least one of the electronic control units, at least one of the first or second pressure-controlled electronic braking assemblies to adjust a pressure of the at least one pressurized fluid stream. For example, one or more of the ECUs may control one or more internal valves or pathways of the at least one of the first or second pressure-controlled electronic braking assemblies in order to adjust (e.g., increase) a pressure of the at least one pressurized fluid stream. As in conventional braking (e.g., non-autonomous vehicle braking), an increased pressure of a pressurized fluid actuates the vehicle brakes.

Method 400 may continue at step 416, which includes providing the adjusted pressurized fluid stream to the at least one vehicle brake set to brake the vehicle. For example, the at least one vehicle brake set could be tractor brakes or trailer brakes or both.

Method 400 may continue at step 418, which includes providing the first and second pressurized fluid streams to a vehicle operator brake pedal. For example, even in the case of most autonomous vehicles (including L4 autonomous vehicle), an operator brake pedal is provided such that a human operator of the vehicle can brake the vehicle at any time. As shown in FIG. 2, an operator brake pedal is integrated into the vehicle braking sub-system for autonomous braking of the vehicle.

Method 400 may continue at step 420, which includes providing the first pressurized fluid stream from a first pressurized fluid control output of the vehicle operator brake pedal to a first pressurized fluid control input of the first pressure-controlled electronic braking assembly. Method 400 may continue at step 422, which includes providing the second pressurized fluid stream from a second pressurized fluid control output of the vehicle operator brake pedal to a second pressurized fluid control input of the first pressure-controlled electronic braking assembly. For example, the vehicle operator brake pedal may be connected in series with the first and second pressure-controlled electronic braking assemblies and upstream of the first pressure-controlled electronic braking assembly (e.g., with the first pressure-controlled electronic braking assembly connected between the operator brake pedal and the second pressure-controlled electronic braking assembly). Thus, there may be two separate and independent pressurized fluid control conduits (with inputs and outputs) that connect the operator brake pedal with the first pressure-controlled electronic braking assembly that is connected to the second pressure-controlled electronic braking assembly).

Method 400 may continue at step 424, which includes a determination of whether the human operator actuates the operator brake pedal. If the determination is yes, then method 400 may continue at step 426, which includes adjusting a pressure of at least one of the first or second pressurized fluid streams with the vehicle operator brake pedal. For example, as with conventional (e.g., non-autonomous) vehicle braking, when the operator depresses the operator brake pedal, the pressure of the pressurized fluid that actuates the vehicle brakes is increased. In this example, actuation. Method 400 may then continue at step 428, which includes providing the adjusted pressurized fluid streams through the first and second pressure-controlled electronic braking assemblies and to the vehicle brake set to brake the vehicle. For example, the adjusted pressure of the pressurized fluid may be greater than any other pressurized fluid control outputs from the pressure-controlled electronic braking assemblies and thus, may pass through the pressure-controlled electronic braking assemblies unchanged to actuate the one or more vehicle brake sets. Thus, in some aspects, actuation of the operator brake pedal may provide a pressure of the pressurized fluid that overrides any control of the pressure-controlled electronic braking assemblies (e.g., to adjust the pressurized fluid passing therethrough) by the ECUs. If the determination in step 424 is no, then method 400 may return to step 402.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "controller" or "electronic control unit" is used broadly to refer to a software-based system, subsystem, or process that is programmed to perform one or more specific functions. Generally, a controller or electronic control unit may be implemented as one or more software modules or components, installed on one or more computers in one or more locations. The processes and logic flows described in this specification can be performed by one or more programmable controllers or electronic control units executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An autonomous vehicle braking system, comprising:
   a plurality of pressure-controlled electronic braking assemblies, each pressure-controlled electronic braking assembly fluidly coupled to at least one of a plurality of pressurized fluid sources and to at least one vehicle brake set of a plurality of vehicle brake sets of the autonomous vehicle, where a pressurized fluid control output of a first pressure-controlled electronic braking assembly of the plurality of pressure-controlled electronic braking assemblies is directly connected, in series, to a pressurized fluid control input of a second pressure-controlled electronic braking assembly of the plurality of pressure-controlled electronic braking assemblies; and
   a plurality of electronic control units, each of the plurality of electronic control units communicably coupled to the first and second pressure-controlled electronic braking assemblies and one or more vehicle sensors, each of the plurality of electronic control units configured to command at least one of the first or second pressure-controlled electronic braking assemblies to adjust a pressure of at least one pressurized fluid stream from the at least one of the first or second pressure-controlled electronic braking assemblies to the at least one vehicle brake set based at least in part on sensor output from the one or more vehicle sensors, the at least one pressurized fluid stream comprising a pneumatic fluid stream.

2. The autonomous vehicle braking system of claim 1, wherein the plurality of pressurized fluid sources comprise a first pressurized fluid source connected to the first and second pressure-controlled electronic braking assemblies and a second pressurized fluid source connected to the first and second pressure-controlled electronic braking assemblies.

3. The autonomous vehicle braking system of claim 1, wherein the pressurized fluid control output of the first pressure-controlled electronic braking assembly comprises a first pressurized fluid control output of the first pressure-controlled electronic braking assembly and the pressurized fluid control input of the second pressure-controlled electronic braking assembly comprises a first pressurized fluid control input of the second pressure-controlled electronic braking assembly, the system further comprising:
   a second pressurized fluid control output of the first pressure-controlled electronic braking assembly directly connected to a second pressurized fluid control input of the second pressure-controlled electronic braking assembly.

4. The autonomous vehicle braking system of claim 3, wherein the second pressure-controlled electronic braking assembly comprises a first pressurized fluid control output fluidly coupled to one of the plurality of vehicle brake sets and a second pressurized fluid control output fluidly coupled to another of the plurality of vehicle brake sets.

5. The autonomous vehicle braking system of claim 3, further comprising a vehicle operator brake pedal comprising a first pressurized fluid control output connected to a first pressurized fluid control input of the first pressure-controlled electronic braking assembly and a second pressurized fluid control output connected to a second pressurized fluid control input of the first pressure-controlled electronic braking assembly.

6. The autonomous vehicle braking system of claim 5, wherein each of the plurality of electronic control units is configured to command at least one of the first or second pressure-controlled electronic braking assemblies to adjust the pressure of at least one pressurized fluid stream from the at least one of the first or second pressure-controlled electronic braking assemblies to the at least one vehicle brake set based at least in part on sensor output from the one or more vehicle sensors in an absence of a pressurized fluid output from either of the first pressurized fluid control output of the vehicle operator brake pedal or the second pressurized fluid control output of the vehicle operator brake pedal.

7. The autonomous vehicle braking system of claim 1, wherein the one or more vehicle sensors comprise at least one of a radar sensor, an image sensor, or a lidar sensor.

8. The autonomous vehicle braking system of claim 1, wherein each of the plurality of pressure-controlled electronic braking assemblies comprises a trailer electronic braking assembly.

9. The autonomous vehicle braking system of claim 1, wherein the plurality of electronic control units are communicably coupled to the first and second pressure-controlled electronic braking assemblies on a communication network.

10. The autonomous vehicle braking system of claim 1, further comprising a plurality of pressurized fluid control valves, each of the pressurized fluid control valves communicably coupled to at least one of the electronic control units and fluidly coupled to a vehicle parking brake, each of the plurality of electronic control units configured to command at least one of the pressurized fluid control valves to adjust a pressure of at least one pressurized fluid stream from the at least one of the first or second pressure-controlled electronic braking assemblies to the vehicle parking brake based at least in part on sensor output from the one or more vehicle sensors.

11. The autonomous vehicle braking system of claim 10, wherein the plurality of pressurized fluid control valves are fluidly coupled in series with a binary valve positioned between the pressurized fluid control valves and the vehicle parking brake, the binary valve further fluidly coupled to an operator parking brake actuator through an operator parking brake control valve.

12. A method for braking an autonomous vehicle, comprising:
providing at least one pressurized fluid stream from at least one of a plurality of pressurized fluid sources to a plurality of pressure-controlled electronic braking assemblies of an autonomous vehicle, each pressure-controlled electronic braking assembly fluidly coupled to at least one vehicle brake set of a plurality of vehicle brake sets of the autonomous vehicle, the at least one pressurized fluid stream comprising a pneumatic fluid stream;
providing the at least one pressurized fluid stream from a pressurized fluid control output of a first pressure-controlled electronic braking assembly of the plurality of pressure-controlled electronic braking assemblies directly to a pressurized fluid control input of a second pressure-controlled electronic braking assembly of the plurality of pressure-controlled electronic braking assemblies that is in a series arrangement with the first pressure-controlled electronic braking assembly;
providing the at least one pressurized fluid stream from the second pressure-controlled electronic braking assembly to the at least one vehicle brake set;
providing sensor output data from one or more vehicle sensors of the autonomous vehicle to a plurality of electronic control units, each of the plurality of electronic control units communicably coupled to the first and second pressure-controlled electronic braking assemblies; and
based at least in part on the sensor output data, controlling, with at least one of the electronic control units, at least one of the first or second pressure-controlled electronic braking assemblies to adjust a pressure of the at least one pressurized fluid stream from the at least one of the first or second pressure-controlled electronic braking assemblies to the at least one vehicle brake set.

13. The method of claim 12, wherein providing at least one pressurized fluid stream from at least one of a plurality of pressurized fluid sources to a plurality of pressure-controlled electronic braking assemblies of an autonomous vehicle comprises:
providing a first pressurized fluid from a first pressurized fluid source to the first and second pressure-controlled electronic braking assemblies; and
providing a second pressurized fluid from a second pressurized fluid source to the first and second pressure-controlled electronic braking assemblies.

14. The method of claim 13, wherein providing the at least one pressurized fluid stream from the pressurized fluid control output of the first pressure-controlled electronic braking assembly of the plurality of pressure-controlled electronic braking assemblies directly to the pressurized fluid control input of the second pressure-controlled electronic braking assembly of the plurality of pressure-controlled electronic braking assemblies comprises:
providing the first pressurized fluid from a first pressurized fluid control output of the first pressure-controlled electronic braking assembly directly to a first pressurized fluid control input of the second pressure-controlled electronic braking assembly; and
providing the second pressurized fluid from a second pressurized fluid control output of the first pressure-controlled electronic braking assembly directly to a second pressurized fluid control input of the second pressure-controlled electronic braking assembly.

15. The method of claim 14, wherein providing the at least one pressurized fluid stream from the second pressure-controlled electronic braking assembly to the at least one vehicle brake set comprises:
providing the first pressurized fluid from a first pressurized fluid control output of the second pressure-controlled electronic braking assembly to one of the plurality of vehicle brake sets; and
providing the second pressurized fluid from a second pressurized fluid control output of the second pressure-controlled electronic braking assembly to another of the plurality of vehicle brake sets.

16. The method of claim 14, further comprising:
providing the first and second pressurized fluid streams to a vehicle operator brake pedal;
providing the first pressurized fluid stream from a first pressurized fluid control output of the vehicle operator brake pedal to a first pressurized fluid control input of the first pressure-controlled electronic braking assembly;
providing the second pressurized fluid stream from a second pressurized fluid control output of the vehicle operator brake pedal to a second pressurized fluid control input of the first pressure-controlled electronic braking assembly;
adjusting, based on operator input, a pressure of at least one of the first or second pressurized fluid streams with the vehicle operator brake pedal; and
providing the adjusted at least one of the first or second pressurized fluid streams through the first and second pressure-controlled electronic braking assemblies and to the at least one vehicle brake set.

17. The method of claim 16, wherein providing the adjusted at least one of the first or second pressurized fluid streams through the first and second pressure-controlled electronic braking assemblies comprises providing the adjusted at least one of the first or second pressurized fluid streams through the first and second pressure-controlled electronic braking assemblies and to the at least one vehicle brake set at an unchanged pressure.

18. The method of claim 12, wherein providing sensor output data from one or more vehicle sensors of the autonomous vehicle to a plurality of electronic control units comprises providing at least one of radar sensor data, image sensor data, or lidar sensor data.

19. The method of claim 12, wherein each of the plurality of pressure-controlled electronic braking assemblies comprises a trailer electronic braking assembly.

20. The method of claim 12, wherein the plurality of electronic control units are communicably coupled to the first and second pressure-controlled electronic braking assemblies on a communication network.

21. The method of claim 12, further comprising:
providing the at least one pressurized fluid stream from the at least one of the plurality of pressurized fluid sources to a plurality of pressurized fluid control valves that are fluidly coupled to a vehicle parking brake through a binary valve;
providing additional sensor output data from the one or more vehicle sensors of the autonomous vehicle to the plurality of electronic control units, each of the plurality of electronic control units communicably coupled to a first or a second pressurized fluid control valves of the plurality of pressurized fluid control valves;
based at least in part on the sensor output data, controlling, with at least one of the electronic control units, at least one of the first or second pressurized fluid control valves to pass the pressurized fluid stream to the binary valve;
based on a pressure of the pressurized fluid stream passed to the binary valve from the at least one of the first or second pressurized fluid control valves being greater than a pressurized fluid stream passed to the binary valve from a third pressurized fluid control valve fluidly coupled to an operator parking brake, actuating the vehicle parking brake.

22. An autonomous vehicle, comprising:
a vehicle frame;
one or more vehicle sensors coupled with the vehicle frame;
a plurality of wheels coupled to the vehicle frame;
at least one vehicle brake set coupled to at least a portion of the plurality of wheels; and
a vehicle braking system, comprising:
a plurality of pressurized fluid supplies,
a plurality of pressure-controlled electronic braking assemblies, each pressure-controlled electronic braking assembly fluidly coupled to at least one of the plurality of pressurized fluid supplies, where a pressurized fluid control output of one of the plurality of pressure-controlled electronic braking assemblies is plumbed directly and in series to a pressurized fluid control input of another of the plurality of pressure-controlled electronic braking assemblies, and
a plurality of electronic control units, each of the plurality of electronic control units communicably coupled to the plurality of pressure-controlled electronic braking assemblies and the one or more vehicle sensors, the plurality of electronic control units configured to perform operations comprising:
receiving sensor data from the one or more vehicle sensors; and
based on the received sensor data, controlling at least one of the plurality of pressure-controlled electronic braking assemblies to adjust a pressure of a pneumatic fluid circulated from at least one of the plurality of pressurized fluid supplies, through the at least one of the pressure-controlled electronic braking assemblies, to the at least one vehicle brake set.

23. The autonomous vehicle of claim 22, wherein the autonomous vehicle comprises a class 8, L4 autonomous vehicle.

24. The autonomous vehicle of claim 22, wherein a first brake sub-assembly comprises a combination of a first pressure-controlled electronic braking assembly and a first electronic control unit, and a second brake sub-assembly comprises a combination of a second pressure-controlled electronic braking assembly different than the first pressure-controlled electronic braking assembly and a second electronic control unit different than the first electronic control unit, and one of the first or second brake sub-assemblies is configured to adjust the pressure of the pneumatic fluid circulated from the at least one of the plurality of pressurized fluid supplies, through the respective first or second pressure-controlled electronic braking assembly, to the at least one vehicle brake set based on the received sensor data independent of the other of the first or second brake sub-assemblies.

25. An autonomous vehicle braking system, comprising:
a plurality of pressure-controlled electronic braking assemblies, each pressure-controlled electronic braking assembly fluidly coupled to at least one of a plurality of pressurized fluid sources and to at least one vehicle brake set of a plurality of vehicle brake sets of the autonomous vehicle, where a pressurized fluid control output of a first pressure-controlled electronic braking assembly of the plurality of pressure-controlled electronic braking assemblies is directly connected, in series, to a pressurized fluid control input of a second pressure-controlled electronic braking assembly of the plurality of pressure-controlled electronic braking assemblies;
a plurality of electronic control units, each of the plurality of electronic control units communicably coupled to the first and second pressure-controlled electronic braking assemblies and one or more vehicle sensors, each of the plurality of electronic control units configured to command at least one of the first or second pressure-controlled electronic braking assemblies to adjust a pressure of at least one pressurized fluid stream from the at least one of the first or second pressure-controlled electronic braking assemblies to the at least one vehicle brake set based at least in part on sensor output from the one or more vehicle sensors; and
a plurality of pressurized fluid control valves, each of the pressurized fluid control valves communicably coupled to at least one of the electronic control units and fluidly coupled to a vehicle parking brake, each of the plurality of electronic control units configured to command at least one of the pressurized fluid control valves to adjust a pressure of at least one pressurized fluid stream from the at least one of the first or second pressure-controlled electronic braking assemblies to the vehicle parking brake based at least in part on sensor output from the one or more vehicle sensors, where the plurality of pressurized fluid control valves and fluidly coupled in series with a binary valve positioned between the pressurized fluid control valves and the vehicle parking brake, the binary valve further fluidly coupled to an operator parking brake actuator through an operator parking brake control valve.

26. The autonomous vehicle braking system of claim 25, wherein each of the plurality of pressure-controlled electronic braking assemblies comprises a trailer electronic braking assembly, and
the plurality of electronic control units are communicably coupled to the first and second pressure-controlled electronic braking assemblies on a communication network.

* * * * *